(12) United States Patent
Cui et al.

(10) Patent No.: US 11,820,595 B2
(45) Date of Patent: Nov. 21, 2023

(54) VERTICAL AUTOMATIC STORAGE CABINET

(71) Applicant: BEIJING ZHONGKE WENCHANG INTELLIGENT TECHNOLOGY CO., LTD., Beijing (CN)

(72) Inventors: Xuehai Cui, Beijing (CN); Gang Liu, Beijing (CN)

(73) Assignee: Beijing Zhongke Wenchang Intelligent Technology Co., Ltd., Beijing (CN)

( * ) Notice: Subject to any disclaimer, the term of this patent is extended or adjusted under 35 U.S.C. 154(b) by 0 days.

(21) Appl. No.: 17/536,257

(22) Filed: Nov. 29, 2021

(65) Prior Publication Data

US 2023/0033520 A1 Feb. 2, 2023

(30) Foreign Application Priority Data

Jul. 30, 2021 (CN) .......................... 202110878626.2

(51) Int. Cl.
*B65G 1/06* (2006.01)
*B25J 15/00* (2006.01)
*B25J 9/10* (2006.01)

(52) U.S. Cl.
CPC ................ *B65G 1/06* (2013.01); *B25J 15/00* (2013.01); *B25J 9/104* (2013.01)

(58) Field of Classification Search
CPC .............. B65G 1/06; B25J 15/00; B25J 9/104
See application file for complete search history.

(56) References Cited

U.S. PATENT DOCUMENTS

| | | | | |
|---|---|---|---|---|
| 3,715,040 A * | 2/1973 | Polus | ................ | G11B 15/6895 294/93 |
| 5,562,384 A * | 10/1996 | Alvite | ................ | H05K 13/0215 221/88 |
| 5,820,055 A * | 10/1998 | Leger | ..................... | G11B 17/22 242/337 |
| 6,729,825 B1 * | 5/2004 | Saliba | ..................... | B25J 15/00 414/280 |
| 9,025,275 B1 * | 5/2015 | Manes | ................ | G11B 33/027 360/92.1 |
| 2021/0243967 A1* | 8/2021 | Bartrom | ................ | B25J 9/1697 |
| 2022/0314256 A1* | 10/2022 | Xu | ......................... | B05B 12/004 |
| 2022/0380124 A1* | 12/2022 | Omori | ..................... | B65G 1/06 |

* cited by examiner

*Primary Examiner* — Saul Rodriguez
*Assistant Examiner* — Ashley K Romano
(74) *Attorney, Agent, or Firm* — Ajay A. Jagtiani; Miles & Stockbridge PC

(57) ABSTRACT

The present invention relates to the technical field of vertical automatic storage cabinets and provides a vertical automatic storage cabinet that comprises: a cabinet body; a storage rack provided on an inner wall of the cabinet body; a storage box, detachably provided on the storage rack; a manipulator assembly provided in the transportation space and being configured to grasp the storage box. In this vertical automatic storage cabinet, storage racks are arranged on both sides in the cabinet body, and the manipulator assembly is located in the area between the two storage racks, the storage boxes on both sides can be taken out of the cabinet body by the manipulator assembly in the middle.

8 Claims, 2 Drawing Sheets

VERTICAL AUTOMATIC STORAGE CABINET

TECHNICAL FIELD

The present invention relates to the technical field of vertical automatic storage cabinets, and in particular relates to a vertical automatic storage cabinet.

BACKGROUND

As a type of intelligent storage device, automatic storage cabinets are widely used in daily life. According to functional details, vertical automatic storage cabinets can be generally categorized into data cabinets, dense cabinets, drawing cabinets, dressing cabinets, lockers, key cabinets, shoe cabinets and employee cabinets, etc.

An automatic storage cabinet in the prior art generally includes a cabinet body, a manipulator and storage racks provided in the cabinet body, wherein the cabinet body is divided into a storage space and a transportation space along the front-and-rear direction of the cabinet body. The manipulator is located in the rear transportation space, and the storage racks are located in the front storage space. The objects at different locations on the storage racks are taken by the movement of the manipulator. This design needs to sacrifice a lot of storage space in the cabinet body to serve as the transportation space of the manipulator, resulting in the decline of space utilization rate and practicability of the storage cabinet.

SUMMARY

Therefore, a technical problem to be solved by the present invention is how to overcome the defect in the prior art that the need for the storage cabinet to sacrifice a lot of storage space in the cabinet body to serve as the transportation space of the manipulator leads to the decline of space utilization and practicability of the storage cabinet, and how to provide a vertical automatic storage cabinet for this purpose.

To solve the above-mentioned technical problem, the technical solution of the present invention is as follows:

The present invention provides a vertical automatic storage cabinet that comprises: a cabinet body; a storage rack provided on an inner wall of the cabinet body, the storage rack being provided along a first direction which is consistent with the height direction of the cabinet body, wherein two storage racks are provided to face each other, and the area between the two storage racks forming a transportation space; a storage box, detachably provided on the storage rack; a manipulator assembly provided in the transportation space and being configured to grasp the storage box.

Further, the manipulator assembly comprises a base, a grasping structure and a stage; the base is configured to move along the first direction; the grasping structure is provided on the base and is configured to translationally move along a second direction, wherein the second direction is a direction perpendicular to the inner wall where the storage rack is located; the stage is provided on the base and located below the grasping structure and is configured to carry the storage box and convey the storage box from the inside of the cabinet to the outside of the cabinet body.

Further, the vertical automatic storage cabinet further comprises a first guide rail provided in the cabinet body, the first guide rail is provided along the first direction, and the base is movable up and down on the first guide rail.

Further, the grasping structure comprises a second guide rail and a gripper; the second guide rail is provided along the second direction on the base; the gripper is movable along the second direction on the base.

Further, the stage comprises a frame body, a driving shaft, a driven shaft, and a conveyor belt; the frame body is provided on the base, the driving shaft and the driven shaft are provided in parallel and spaced apart on the frame body, and the conveyor belt is provided around the surfaces of the driving shaft and the driven shaft; wherein the conveying direction of the conveyor belt is perpendicular to both the first direction and the second direction.

Further, the storage rack comprises a mounting plate and a support; the mounting plate is provided along the first direction, and the support is provided on the mounting plate; one side of the storage box is provided with a first clamping joint corresponding to the support in a one-to-one manner and being pluggable to the support.

Further, each of the storage racks comprises two mounting plates provided in parallel and spaced apart, a plurality of the supports is provided on each of the mounting plates in a spaced apart manner, and the supports on the two mounting plates correspond to each other in a one-to-one manner.

Further, the other side of the storage box is provided with a second clamping joint, wherein the second clamping joint and the first clamping joint are respectively located on two opposite sides of the storage box; one end of the gripper away from the base is provided with a clamping slot configured to be engaged with the second clamping joint to pull the first clamping joint out of the support, or to insert the first clamping joint into the support.

Further, the storage box comprises a box body and a shell; a first snap-fit body is provided on an outer wall of the box body, and a second snap-fit body is provided on an inner wall of the shell, the first snap-fit body is configured to be snap-fitted with the second snap-fit body, so that the box body is detachably arranged in the shell; the first clamping joint and the second clamping joint are both provided on an outer wall of the shell.

Further, a retrieval window is provided on one side surface of the cabinet body, and the side surface where the retrieval window is located is perpendicular to a conveying direction of a conveyor belt.

The technical solution of the present invention has the following advantages:

In the vertical automatic storage cabinet provided by the present invention, storage racks are arranged on both sides in the cabinet body, and the manipulator assembly is located in the area between the two storage racks. When in use, the storage boxes on both sides can be taken out of the cabinet body by the manipulator assembly in the middle, or the storage boxes can be stored into the cabinet body by the manipulator assembly in the middle. When compared with the vertical automatic storage cabinets in the prior art, the thickness of the vertical automatic storage cabinet of the present invention is reduced, which facilitates reducing the occupied space; moreover, there is no need to sacrifice a lot of space in the cabinet body to operate the manipulator, which improves the space utilization rate and practicability of the cabinet body.

BRIEF DESCRIPTION OF THE DRAWINGS

In order to more clearly describe the technical solutions in the specific embodiments of the present invention or in the prior art, a brief introduction will be made hereinafter to the drawings needed to be used in the description of the specific embodiments or the prior art. Apparently, the drawings in the following description are some of the embodiments of the present invention. For a person skilled in the art, other drawings can be obtained based on these drawings without expenditure of creative labor.

Figure 1:
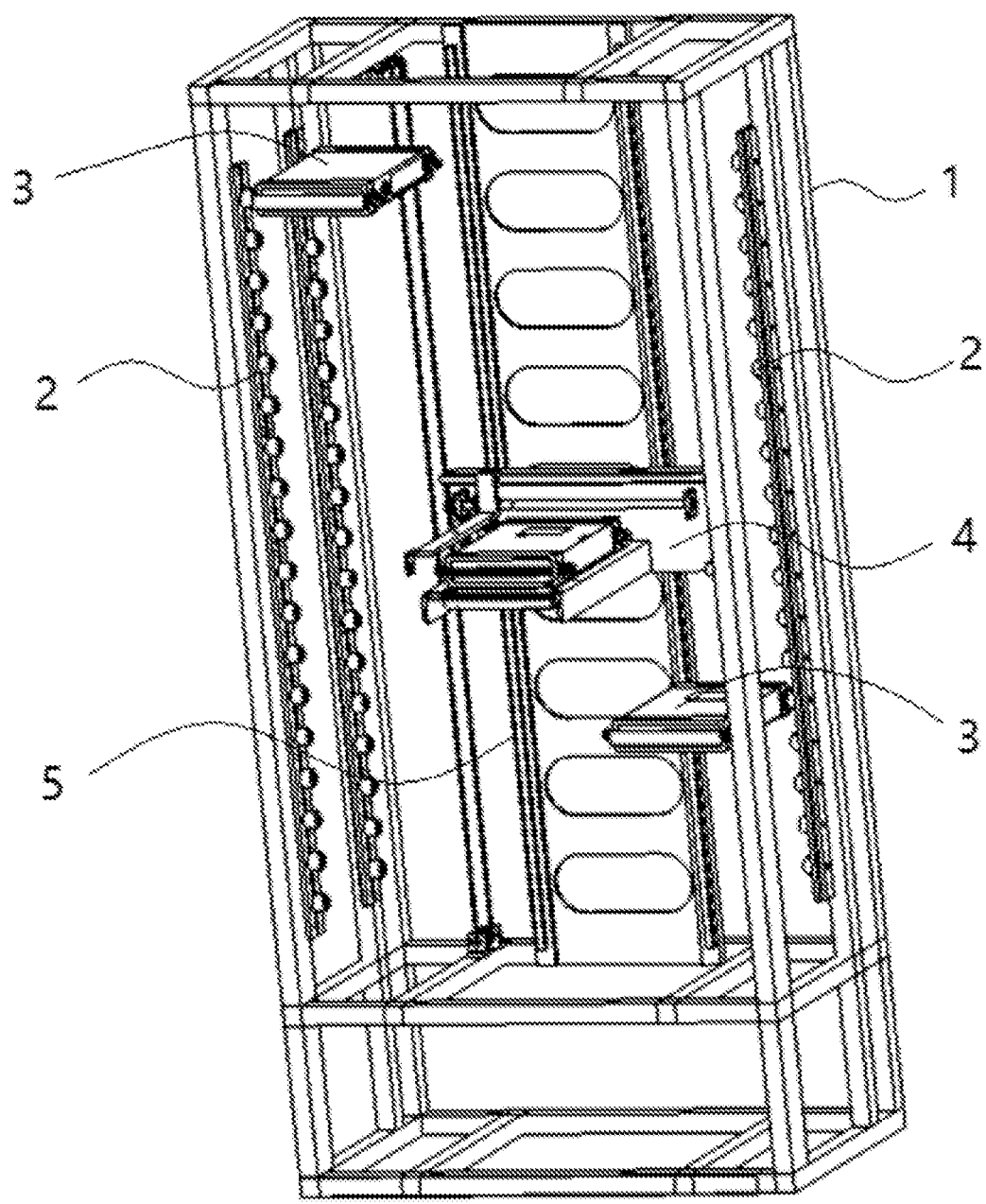
FIG. 1 is a structural schematic diagram of a vertical automatic storage cabinet in an embodiment of the present invention.

LIST OF REFERENCE SIGNS 1 cabinet body
2 storage rack
3 storage box
4 manipulator assembly
5 first guide rail
6 second guide rail
7 gripper
8 clamping slot
9 base
10 stage
11 driven shaft
12 support
13 box body
14 shell
15 first clamping joint
16 second clamping joint
17 mounting plate

DETAILED DESCRIPTION OF SPECIFIC EMBODIMENTS

The technical solutions of the present invention will be clearly and completely described below in conjunction with the appended drawings. Apparently, the described embodiments are part of the embodiments of the present invention, rather than all of the embodiments. Based on the embodiments described in the present invention, all other embodiments obtained by a person skilled in the art without expenditure of creative labor shall fall within the protection scope of the present invention.

In the description of the present invention, it should be noted that the orientation or positional relationship indicated by the terms "center", "upper", "lower", "left", "right", "vertical", "horizontal", "inner", "outer" and so on is based on the orientation or positional relationship shown in the appended drawings, and is only for the convenience of describing the present invention and simplifying the description, rather than indicates or implies that the indicated device or element must have a specific orientation or must be configured and operated in the specific orientation, therefore it cannot be interpreted as a limitation of the present invention. In addition, the terms "first", "second", and "third" are only used for descriptive purposes, and cannot be interpreted as indicating or implying relative importance.

In the description of the present invention, it should be noted that, unless clearly specified and defined otherwise, the terms "mounted", "interconnected" or "connected" should be understood in a broad sense, for example, it may be a fixed connection, a detachable connection or an integral connection; it may be a mechanical connection or an electrical connection; it may be a direct connection, or it may be an indirect connection through an intermediate medium, or it may be an internal communication between two elements. For an ordinary person skilled in the art, the specific meanings of the above-mentioned terms in the present invention may be understood in accordance with the specific context thereof.

In addition, the technical features involved in the different embodiments of the present invention described below may be combined with each other as long as they do not conflict with each other.

FIG. 1 is a structural schematic diagram of a vertical automatic storage cabinet in an embodiment of the present invention; as shown in FIG. 1, the present embodiment provides a vertical automatic storage cabinet that comprises: a cabinet body 1; a storage rack 2 provided on an inner wall of the cabinet body 1, the storage rack 2 being provided along a first direction which is consistent with the height direction of the cabinet body 1, wherein two storage racks 2 are provided to face each other, and the area between the two storage racks 2 forms a transportation space; a storage box 3, detachably provided on the storage rack 2; a manipulator assembly 4, provided in the transportation space and being configured to grasp the storage box 3.

Specifically, the cabinet body 1 may be a cabinet body 1 with a cuboid structure, and the interior of the cabinet body 1 is hollow. For example, the storage racks 2 are provided on both the left and right inner walls of the cabinet body 1, and the storage racks 2 may be fixed on the inner walls of the cabinet body 1 by bolts. A plurality of storage boxes 3 are provided on the storage rack 2 from top to bottom, and a certain interval is reserved between every two upper and lower adjacent storage boxes 3 to facilitate being grasped by the manipulator assembly 4. The manipulator assembly 4 is located between the two storage racks 2, the manipulator assembly 4 may move up and down, and may also translationally move left and right, and further may move back and forth, so that it may be convenient to take out the storage boxes 3 on the left and right sides and transfer them to the outside of the cabinet body 1, or to transfer the storage box 3 from the outside the cabinet body 1 to any position on the storage rack 2. It is enough for the thickness of the cabinet body 1 to be slightly larger than the size of the storage box 3, and there is no need to reserve an operating space for the manipulator assembly 4 at the rear, which is beneficial for reducing the volume of the cabinet body 1 and improving the utilization efficiency of the space in the cabinet body 1.

In the vertical automatic storage cabinet provided by the present invention, storage racks 2 are provided on both sides in the cabinet body 1, and the manipulator assembly 4 is located in the area between the two storage racks 2. When in use, the storage boxes 3 on both sides may be taken out of the cabinet body 1 by the manipulator assembly 4 in the middle, or the storage boxes 3 can be stored into the cabinet body 1 by the manipulator assembly in the middle. When compared with the vertical automatic storage cabinets in the prior art, the thickness of the vertical automatic storage cabinet of the present invention is reduced, which is beneficial for reducing the occupied space; Moreover, there is no need to sacrifice a lot of space in the cabinet body 1 to operate the manipulator, which improves the space utilization rate and practicability of the cabinet body 1.

Figure 2:
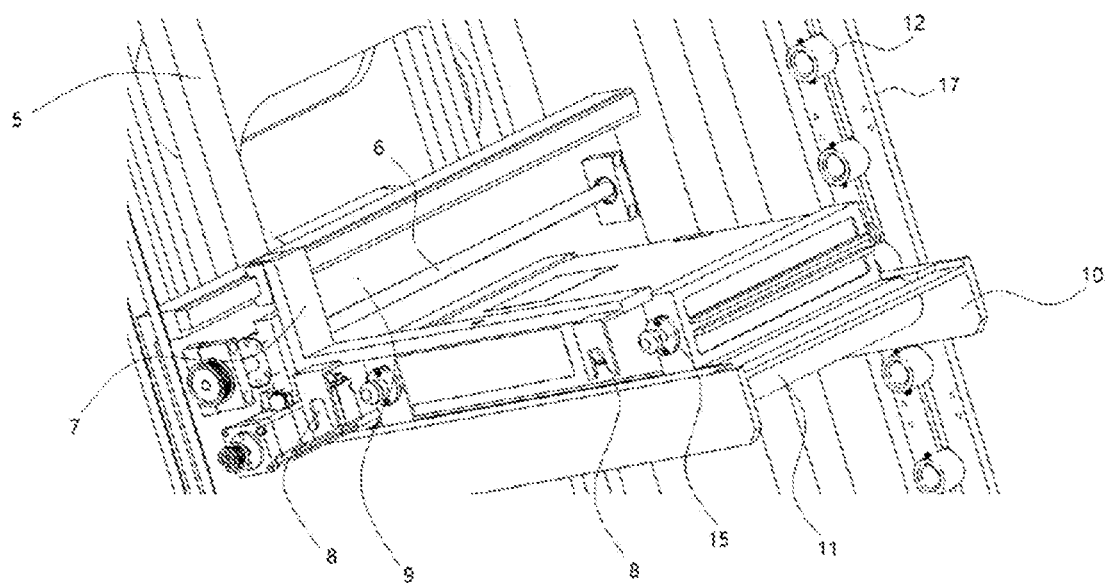
FIG. 2 is a structural schematic diagram of a manipulator assembly in the vertical automatic storage cabinet in the embodiment of the present invention.

FIG. 2 is a structural schematic diagram of the manipulator assembly in the vertical automatic storage cabinet in the embodiment of the present invention; as shown in FIG. 2, in the present embodiment, the manipulator assembly 4 comprises a base 9, a grasping structure and a stage 10; the base 9 is configured to move along the first direction; for example, the base 9 may be a vertically-arranged plate. The grasping structure is provided on the base 9 and is configured to translationally move along a second direction, wherein the second direction is a direction perpendicular to the inner wall where the storage rack 2 is located; the storage boxes 3 on the left and right sides may be removed from the storage rack 2 by moving the grasping structure to the left or right. The stage 10 is provided on the base 9 and located below the grasping structure, and the stage 10 is configured to carry the storage box 3 and convey the storage box 3 from the inside of the cabinet body 1 to the outside of the cabinet body 1.

Wherein, the stage 10 and the grasping structure are both located on the same surface of the base 9, and the grasping structure is located above the stage 10. When the grasping structure removes the storage box 3 from the storage rack 2, the storage box 3 may be placed on the stage 10 and then is transferred to the outside of the cabinet body 1 by using the stage 10.

In this embodiment, the vertical automatic storage cabinet further comprises a first guide rail 5 provided in the cabinet body 1. The first guide rail 5 is provided along the first direction, and the base 9 is movable up and down on the first guide rail 5. Wherein, a slider may be provided on one side of the base 9 opposite to the stage 10, and the slider is sleeved on the first guide rail 5 so that the base 9 may move along the first guide rail 5. Wherein, the two ends of the first guide rail 5 may be respectively welded to the top and bottom surfaces of the cabinet body 1. For the drive of the base 9, it may be driven by a motor with a belt, or it may be driven by a motor with a screw rod. For example, a motor may be provided on the top surface of cabinet body 1, and a rotating shaft may be provided at a corresponding position on the bottom surface of cabinet body 1. The belt is wound on an output shaft of the motor and the rotating shaft, and the belt may be driven to rotate when the motor rotates. Meanwhile, a connector is provided on the side of the base 9 adjacent to the belt, the connector is fixedly connected to the belt and may move synchronously with the belt, so that ultimately the base 9 is driven to move up and down via the connector. Wherein, two first guide rails 5 may be provided in parallel and spaced apart to improve the stability of the movement of the base 9.

In this embodiment, the grasping structure comprises a second guide rail 6 and a gripper 7; the second guide rail 6 is provided along the second direction on the base 9; the gripper 7 is movable along the second direction on the base 9. For example, the second guide rail 6 may be a screw rod, and the gripper 7 is sleeved on the second guide rail 6 through a nut. One end of the second guide rail 6 may be connected with an output shaft of a motor. The screw rod may be driven to rotate when the motor rotates, so that the gripper 7 may move left or right along the second direction.

In this embodiment, the stage 10 comprises a frame body, a driving shaft, a driven shaft 11 and a conveyor belt; the frame body is provided on the base 9, the driving shaft and the driven shaft 11 are provided in parallel and spaced apart on the frame body, and the conveyor belt is provided around the surfaces of the driving shaft and the driven shaft 11; wherein, the conveying direction of the conveyor belt is perpendicular to both the first direction and the second direction.

Wherein, the frame body may be provided horizontally, and the frame body remains perpendicular to the base 9. The frame body may be welded or bonded to the base 9, or the frame body and the base 9 are formed as an integral structure. The driving shaft may be rotatably mounted on one side of the frame body adjacent to the base 9 through a bearing. Correspondingly, the driven shaft 11 may be rotatably mounted on the other side of the frame body away from the base 9 through a bearing. The driving shaft may be directly driven by a motor to rotate along its own axis, thereby driving the conveyor belt to move. The conveyor belt may transport the storage box 3 placed thereon forward or backward.

In this embodiment, the storage rack 2 comprises a mounting plate 17 and a support 12; the mounting plate 17 is provided along the first direction, and the support 12 is provided on the mounting plate 17; one side of the storage box 3 is provided with a first clamping joint 15 corresponding to the support 12 in a one-to-one manner and being pluggable to the support 12.

For example, each of the storage racks 2 comprises two mounting plates 17 provided in parallel and spaced apart, a plurality of the supports 12 is provided on each of the mounting plates 17 in a spaced apart manner, and the supports 12 on the two mounting plates 17 correspond to each other in a one-to-one manner.

Figure 3:
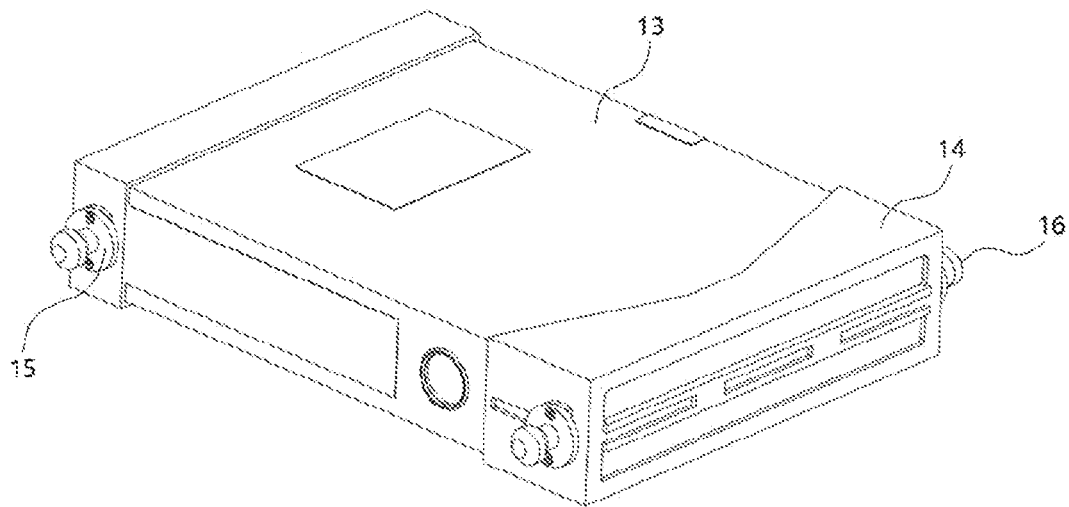
FIG. 3 is a structural schematic diagram of a storage box in the vertical automatic storage cabinet in the embodiment of the present invention.

FIG. 3 is a schematic structural diagram of the storage box in the vertical automatic storage cabinet in the embodiment of the present invention. As shown in FIG. 3, for example, the other side of the storage box 3 is provided with a second clamping joint 16, wherein the second clamping joint 16 and the first clamping joint 15 are respectively located on two opposite sides of the storage box 3; one end of the gripper 7 away from the base 9 is provided with a clamping slot 8 configured to be engaged with the second clamping joint 16 to pull the first clamping joint 15 out of the support 12, or to insert the first clamping joint 15 into support 12.

Wherein, the structure of the first clamping joint 15 and the structure of the second clamping joint 16 may be identical to improve the versatility of the storage box 3. For example, the first clamping joint 15 may be installed on the shell 14 by screw bolts. Wherein, the first clamping joint 15 may be a structure with two larger ends and a smaller middle part. For example, one end of the first clamping joint 15 away from the shell 14 may be a spherical structure, and the other end thereof adjacent to the shell 14 may be a circular plate. Wherein, the support 12 may have a cylindrical structure, and the end of the support 12 facing away from the mounting plate 17 has an open structure for inserting the first clamping joint 15 therein. When in use, the end of the first clamping joint 15 having the spherical structure may be inserted into the support 12.

Wherein, the gripper 7 may be an L-shaped plate, of which the vertical segment is movably provided on the second guide rail 6 and the horizontal segment is parallel to the conveyor belt, and two forks are provided in a front position and a rear position, respectively, so as to be spaced apart on the horizontal segment of the L-shaped plate. For example, the fork may also be an L-shaped plate, and the bottom of the fork is provided with the clamping slot 8. Taking the storage box 3 placed on the left storage rack 2 as an example, when it needs to remove this storage box 3, the gripper 7 is moved so that the clamping slot 8 thereof can clamp the part between the circular plate and the spherical structure, and then the gripper 7 is moved to the right to pull the first clamping joint 15 out from the support 12.

Wherein, in order to improve the fixing effect of the storage rack 2 for the storage box 3, a cantilever bracket plate may be provided on each mounting plate 17. When the first clamping joint 15 on the storage box 3 is inserted into the support 12, the bottom surface of the storage box 3 is in contact with the top surface of the cantilever bracket plate to have a certain supporting effect for the storage box 3.

In this embodiment, the storage box 3 comprises a box body 13 and a shell 14; a first snap-fit body is provided on an outer wall of the box body 13, and a second snap-fit body is provided on an inner wall of the shell 14, the first snap-fit body is configured to be snap-fitted with the second snap-fit body, so that the box body 13 is detachably arranged in the shell 14; the first clamping joint 15 and the second clamping joint 16 are both provided on an outer wall of the shell 14.

For example, the shell 14 and the box body 13 may have a structure similar to that of a drawer, and the box body 13 may be drawn out of the shell 14. For example, the first snap-fit body and the second snap-fit body may be magnets with opposite magnetic polarities. The first snap-fit body may be adhesively bonded to the box body 13, and the second snap-fit body may be adhesively bonded to the shell 14.

In this embodiment, a retrieval window is provided on one side surface of the cabinet body 1, and the side surface where the retrieval window is located is perpendicular to the conveying direction of the conveyor belt. For example, the retrieval window may be provided at the center of the side surface of the cabinet body 1. The size of the retrieval window may be designed according to the size of the storage box 3, which will not be described in detail herein.

As for the vertical automatic storage cabinet provided by the present invention, when in use, if the storage box 3 needs to be stored into the cabinet body 1, the storage box 3 may be inserted through the retrieval window and placed on the conveyor belt, and the conveyor belt is reversely rotated to put the storage box 3 in place. Then the base 9 moves up or moves down to bring the storage box 3 to the target height. If it needs to place the storage box 3 on the left storage rack 2, the gripper 7 grabs the second clamping joint 16 on the right side of the storage box 3, and then the gripper 7 moves to the left until the first clamping joint 15 on the left side of the storage box 3 is inserted into the support 12. At this time, the gripper 7 rises to become separated from the second clamping joint 16 and return to its initial position. Likewise, when the storage box 3 in the cabinet body 1 needs to be taken out, the operation may be reversed.

In summary, when compared with the vertical automatic storage cabinets in the prior art, the vertical automatic storage cabinet provided by the present invention has a reduced thickness, which is beneficial for reducing the occupied space; moreover, there is no need to sacrifice the a lot of space in the cabinet body 1 to operate the manipulator, which improves the space utilization rate and practicability of the cabinet body 1.

Apparently, the foregoing embodiments are merely examples for clearly describing the present invention, and are not intended to limit the implementation ways thereof. For an ordinary person skilled in the art, other changes or modifications in different forms may be made on the basis of the above description. It is unnecessary and impossible to exhaustively list all the embodiments herein. Any obvious changes or modifications derived from this are still within the protection scope of the present invention.

The invention claimed is:

1. A vertical automatic storage cabinet, characterized in that, the vertical automatic storage cabinet comprises:
   a cabinet body;
   a storage rack, provided on an inner wall of the cabinet body, the storage rack being provided along a first direction which is consistent with the height direction of the cabinet body, wherein two storage racks are provided to face each other, and the area between the two storage racks forms a transportation space;
   a storage box, detachably provided on the storage rack; and
   a manipulator assembly, provided in the transportation space and being configured to grasp the storage box,
   wherein the storage rack comprises a mounting plate and a support;
   wherein the mounting plate is provided along the first direction, and the support is provided on the mounting plate;
   wherein one side of the storage box is provided with a first clamping joint corresponding to the support in a one-to-one manner and being pluggable to the support,
   wherein the other side of the storage box is provided with a second clamping joint, wherein the second clamping joint and the first clamping joint are respectively located on two opposite sides of the storage box;
   wherein one end of the gripper away from the base is provided with a clamping slot configured to be engaged with the second clamping joint to pull the first clamping joint out of the support or to insert the first clamping joint into the support.

2. The vertical automatic storage cabinet according to claim 1, characterized in that, the manipulator assembly comprises a base, a grasping structure and a stage,
   the base is configured to move along the first direction;
   the grasping structure is provided on the base and is configured to translationally move along a second direction, wherein the second direction is a direction perpendicular to the inner wall where the storage rack is located;
   the stage is provided on the base and located below the grasping structure, and is configured to carry the storage box and convey the storage box from the inside of the cabinet body to the outside of the cabinet body.

3. The vertical automatic storage cabinet according to claim 2, characterized in that, the vertical automatic storage cabinet further comprises a first guide rail provided in the cabinet body, the first guide rail is provided along the first direction, and the base is movable up and down on the first guide rail.

4. The vertical automatic storage cabinet according to claim 2, characterized in that,
   the grasping structure comprises a second guide rail and a gripper;
   the second guide rail is provided along the second direction on the base;
   the gripper is movable along the second direction on the base.

5. The vertical automatic storage cabinet according to claim 2, characterized in that, the stage comprises a frame body, a driving shaft, a driven shaft, and a conveyor belt,
   the frame body is provided on the base, the driving shaft and the driven shaft are provided in parallel and spaced apart on the frame body, and the conveyor belt is provided around the surfaces of the driving shaft and the driven shaft;
   wherein, the conveying direction of the conveyor belt is perpendicular to both the first direction and the second direction.

6. The vertical automatic storage cabinet according to claim 1, characterized in that,
   each of the storage racks comprises two mounting plates provided in parallel and spaced apart, a plurality of the supports is provided on each of the mounting plates in a spaced apart manner, and the supports on the two mounting plates correspond to each other in a one-to-one manner.

7. The vertical automatic storage cabinet according to claim 1, characterized in that, the storage box comprises a box body and a shell;

a first snap-fit body is provided on an outer wall of the box body, and a second snap-fit body is provided on an inner wall of the shell, the first snap-fit body is configured to be snap-fitted with the second snap-fit body, so that the box body is detachably arranged in the shell;

the first clamping joint and the second clamping joint are both provided on an outer wall of the shell.

8. The vertical automatic storage cabinet according to claim 1, characterized in that, a retrieval window is provided on one side surface of the cabinet body, and the side surface where the retrieval window is located is perpendicular to a conveying direction of a conveyor belt.

\* \* \* \* \*